(12) United States Patent
Kuno et al.

(10) Patent No.: US 7,019,774 B2
(45) Date of Patent: Mar. 28, 2006

(54) IMAGING APPARATUS AND MOBILE TERMINAL INCORPORATING SAME

(75) Inventors: Tetsuya Kuno, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/232,715

(22) Filed: Sep. 3, 2002

(65) Prior Publication Data

US 2003/0081132 A1    May 1, 2003

(30) Foreign Application Priority Data

Oct. 30, 2001  (JP)  ............................. 2001-332252
Mar. 20, 2002  (JP)  ............................. 2002-078470

(51) Int. Cl.
*H04N 5/335*   (2006.01)

(52) U.S. Cl. ................. 348/219.1; 348/294; 348/222.1

(58) Field of Classification Search ............. 348/219.1, 348/294, 222.1
See application file for complete search history.

(56) References Cited

U.S. PATENT DOCUMENTS 6,456,324 B1 * 9/2002  Yamada et al. .......... 348/219.1
6,639,625 B1 * 10/2003 Ishida et al. ............. 348/218.1
6,667,772 B1 * 12/2003 Oliver ......................... 348/375

FOREIGN PATENT DOCUMENTS

| JP | 63-284980 | * | 11/1988 |
| JP | 11-168688 A | | 6/1999 |
| JP | 11-355790 A | | 12/1999 |
| JP | 2000-152263 A | | 5/2000 |
| JP | 2000-184386 A | | 6/2000 |

* cited by examiner

*Primary Examiner*—Tuan Ho
(74) *Attorney, Agent, or Firm*—Birch, Stewart, Kolasch & Birch, LLP

(57) ABSTRACT

An imaging apparatus includes an imaging device having a square row-column pixel matrix, and having units for transferring pixel signals in the row direction and the column direction of the matrix. The rows and columns of the pixel matrix are oriented at angles of forty-five degrees with respect to the vertical axis of the imaging apparatus. After being read from the imaging apparatus in row-column order, the pixel signals are reordered to conform to a scanning sequence with horizontal or vertical scanning lines. Alternatively, the pixel signals are read from the imaging device in this scanning sequence. Improved horizontal and vertical resolution is thereby obtained from an imaging apparatus with a conventional square pixel matrix.

11 Claims, 13 Drawing Sheets

IMAGING APPARATUS AND MOBILE TERMINAL INCORPORATING SAME

BACKGROUND OF THE INVENTION

1. Field of the Invention

The present invention relates to imaging apparatus with improved resolution, and in particular to a compact imaging apparatus useful in, for example, a mobile telephone or mobile information-processing device.

2. Description of the Related Art

Recent years have seen the appearance of imaging apparatus that captures an image of a subject in the form of digital information. Digital cameras are a notable example, but there is also much interest in incorporating smaller imaging apparatus of this type into portable terminal equipment such as mobile telephones and personal digital assistants (PDAs). As the size of the imaging apparatus decreases, however, picture quality deteriorates because the number of picture elements (pixels) is reduced.

FIG. 1 schematically shows an imaging apparatus comprising a lens system 1, and an imaging device 2 mounted on a supporting substrate 3. The X, Y, and Z axes in the drawing indicate absolute directions: the Z axis indicates the direction of the optic axis; the Y axis indicates the vertical direction as defined by the force of gravity, that is, the direction in which a plumb line would hang. The imaging device 2 comprises an array of pixels aligned horizontally and vertically in the XY plane. The image formed on the imaging device is inverted by the lens system 1 so that when a standing human subject is imaged, for example, the Y-axis arrow in the drawing points from the subject's head toward the subject's feet.

FIG. 2 shows an enlarged schematic view of part of the imaging device 2. The X and Y axes in FIG. 2 match the X and Y axes in FIG. 1. The imaging device 2 comprises an array of photoelectric transducers 2a, each of which converts incident light to an electric signal. The letters R, G, and B in FIG. 2 indicate photoelectric transducers 2a with red filters, green filters, and blue filters, respectively. Each photoelectric transducer 2a constitutes one pixel. The pixels are arranged in a square matrix; that is, they are arranged in straight rows and columns, with equal spacing in the row and column directions.

It is common for each pixel in a color imaging device 2 to have a red, green, or blue filter as shown in FIG. 2. If the purpose of the imaging device 2 is to obtain an image for display on a computer monitor screen, or on any type of liquid crystal display (LCD) screen, it is also common for the pixels to be arranged in a square matrix, because the pixels of the display device have a square matrix arrangement. The pixel signals of the imaging device 2 are read out sequentially in a scanning sequence that advances from the bottom scanning line to the top scanning line, as indicated by the lines C and D with arrows in FIG. 2. The scanning sequence proceeds parallel to the X axis, as indicated by line C, until all pixels in one line have been scanned, then proceeds to the line immediately above, as indicated by line D.

Referring to FIG. 3, the imaging device 2 in FIG. 2 may be structured as a charge-coupled device, also referred to as a CCD image sensor or CCD imager. Reference numeral 2e in FIG. 3 denotes a photodiode that performs photoelectric conversion. Electrical charges that accumulate in the photodiodes 2e are transferred sequentially in the vertical direction through vertical transfer registers 2f, then in the horizontal direction through a horizontal transfer register 2g, and are read out through a readout circuit 2h. The vertical transfer registers 2f are also referred to as interline transfer registers.

FIG. 4 is a block diagram showing how signals are processed in a conventional imaging apparatus. Reference numeral 1 denotes the lens system, 2 denotes the imaging device, 4 denotes a correlated double sampling (CDS) circuit, 5 denotes an amplifier, 6 denotes a signal processing circuit that carries out processes necessary for the amplified signal to be converted into a picture signal, 6a denotes a selector, 6b denotes a synchronizing circuit, and 7 denotes a timing generator (TG).

The correlated double sampling circuit 4 receives a sequence of pixel signals, read out from the imaging device 2 according to driving pulses supplied from the timing generator 7, and eliminates noise components from the pixel signals, leaving only the desired signal component of the subject being imaged. The 'cleaned-up' signal output from the correlated double sampling circuit 4 is supplied through the amplifier 5 to the signal processing circuit 6, which includes the selector 6a and synchronizing circuit 6b. From the pixel signals output by the imaging device 2, the selector 6a selects the pixel signals belonging to the effective picture area, that is, the area that will actually be displayed on a display screen (not shown in the drawing).

FIG. 5 shows the relationship between the effective picture area and the effective pixel area in the imaging device 2. Reference numeral 1a denotes the image circle of the lens system 1; reference numeral 2c denotes the effective pixel area of the imaging device 2, that is, the area in which non-masked pixels are disposed; reference numeral 2d denotes the effective picture area. Pixel signals are generated by light incident on any pixels in the effective pixel area 2c, but a valid picture signal is obtainable only within the area covered by the image circle 1a. The effective picture area 2d is therefore smaller than the effective pixel area 2c, being confined to a rectangular area within the image circle 1a. From the signals output by pixels in the effective pixel area 2c of the imaging device 2, the selector 6a selects the signals output by pixels disposed in the effective picture area 2d, and supplies them to the synchronizing circuit 6b.

The signal generated by a pixel includes information for only one color: red, green, or blue. To obtain complete red, blue, and green signals, the synchronizing circuit 6b interpolates the values of the color signals missing from each pixel. For example, the synchronizing circuit 6b provides green and blue signal values for pixels having red filters.

One method of improving the picture quality of a square pixel matrix of the type described above is to increase the resolution by increasing the pixel density, thereby increasing the number of pixels in the matrix. If the pixel density is increased, however, each pixel has less light-receiving area, causing an inevitable loss of sensitivity. Thus the approach to improved picture quality through higher pixel density entails an inherent compromise between sensitivity and resolution.

To circumvent this compromise, another method of obtaining higher resolution and better picture quality has been proposed. FIG. 6 is a graph shown in "High-Definition Still Image Processing System Using a New Structure CCD Sensor", Proceedings of SPIE, Vol. 3965 (2000), pp. 431–436, which illustrates the frequency characteristics of subjects imaged in natural scenes. FIGS. 7 to 10 are graphs illustrating frequency characteristics of a square matrix of imaging elements of the type shown in FIG. 2. FIG. 7 shows the limit spatial frequency range of a black-and-white picture imaged by imaging elements arranged in a square matrix, FIG. 8 shows the limit spatial frequency range of the green signal, FIG. 9 shows the limit spatial frequency range of the red signal, and FIG. 10 shows the limit spatial frequency range of the blue signal. A comparison of FIG. 7 with FIG. 6 shows that while natural subjects tend to have the widest spatial frequency ranges in the horizontal and vertical directions, the widest frequency ranges of a square pixel matrix are oriented at angles of forty-five degrees to the horizontal and vertical axes. There is thus a major mismatch between the frequency characteristics of the imaging device and the frequency characteristics of the subjects typically imaged. This suggests that the frequency characteristics of the image in the horizontal and vertical directions can be improved by changing the pixel arrangement.

For example, FIG. 11 shows a honeycomb arrangement of imaging elements disclosed in Japanese Unexamined Patent Application Publication No. 11-168688. In this arrangement the pixels are offset horizontally and vertically, the horizontal spacing between pixels being increased from PH to $\sqrt{2}\cdot$PH, and the vertical spacing between pixel rows being decreased from PV to PV/$\sqrt{2}$. This honeycomb arrangement is obtainable from the square matrix arrangement shown in FIG. 12 by tilting the matrix at an angle of forty-five degrees, as shown in FIG. 13. If the pixel column spacing PH and pixel row spacing PV in FIG. 12 are both equal to N, then the pixel column spacing and pixel row spacing in FIG. 13 are both reduced to N/$\sqrt{2}$. The offset arrangement therefore has higher resolution in the horizontal and vertical directions.

FIGS. 14 to 17 are graphs illustrating frequency characteristics of the offset arrangement. FIG. 14 shows the limit spatial frequency range of a black-and-white picture imaged by imaging elements arranged in the offset arrangement, FIG. 15 shows the limit spatial frequency range of the green signal, FIG. 16 shows the limit spatial frequency range of the red signal, and FIG. 17 shows the limit spatial frequency range of the blue signal. Whereas the maximum horizontal and vertical spatial frequencies resolvable by the square matrix were 1/N (FIG. 7), the maximum horizontal and vertical spatial frequencies resolvable by the offset arrangement are increased to $\sqrt{2}$/N (FIG. 7). The offset arrangement therefore provides improved frequency characteristics in both the horizontal and vertical directions. FIG. 18 shows the spatial frequency characteristic of the square matrix and the spatial frequency characteristic of the offset arrangement superimposed on one another. The frequency characteristic of the offset arrangement (hatched) can be seen to resemble the frequency characteristics of natural subjects more closely than does the frequency characteristic of the square matrix.

The offset arrangement of imaging elements shown in FIG. 11 can therefore provide improved resolution in typical pictures of natural subjects. The problem is how to read out the pixel signals. In the Japanese Unexamined Patent Application cited above, the vertical transfer registers 2f zigzag around the photodiodes 2e as indicated by the arrows in FIG. 11. To reach the horizontal transfer register 2g, the electric charges must therefore travel further than in a square matrix, in which the vertical transfer registers 2f are aligned in straight columns, and more vertical transfer registers 2f are necessary than in a square matrix. The extra distance impairs the efficiency of the charge transfer process, and the increased number of vertical transfer registers 2f makes the structure of the imaging device more complex, hence more difficult to manufacture, than a conventional square matrix.

SUMMARY OF THE INVENTION

An object of the present invention is to provide an imaging apparatus that has a conventional square pixel matrix, but obtains improved resolution in both the horizontal and vertical directions.

Another object is to provide an imaging apparatus that is easy to manufacture but has improved resolution in both the horizontal and vertical directions.

The invented imaging apparatus includes an imaging apparatus with a square row-column matrix of pixels. The imaging apparatus includes a first transfer unit for transferring pixel signals in the column direction of the matrix, and a second transfer unit for receiving the pixel signals from the first transfer unit and transferring the pixel signals in the row direction of the matrix. The imaging apparatus is mounted on a supporting substrate so that the rows and columns of the pixel matrix are oriented at angles of substantially forty-five degrees to the vertical axis of the imaging apparatus.

The forty-five-degree inclination of the rows and columns improves the horizontal and vertical resolution of the imaging apparatus by substantially a factor equal to the square root of two, while permitting the continued use of a standard square pixel matrix of the type already manufactured in large quantities.

In a first embodiment of the invention, the pixel signals are output from the imaging apparatus in row and column order, temporarily stored in a memory, and then read from the memory in a different order, conforming to a scanning sequence with scanning lines parallel to or perpendicular to the vertical axis of the imaging apparatus.

In a second embodiment of the invention, the imaging apparatus includes switches, and has scanning circuits that control the switches so that the pixel signals are output from the imaging apparatus in a scanning sequence with scanning lines parallel to or perpendicular to the vertical axis of the imaging apparatus.

In both embodiments, interpolation is preferably carried out to supply pixel values at missing pixel positions, so that the final output signal is compatible with signals from existing digital imaging apparatus.

The invention also provides a portable terminal incorporating the first embodiment of the invented imaging apparatus. The portable terminal includes a computing device that both performs terminal functions and controls the above-mentioned memory.

DETAILED DESCRIPTION OF THE INVENTION

Figure 1:
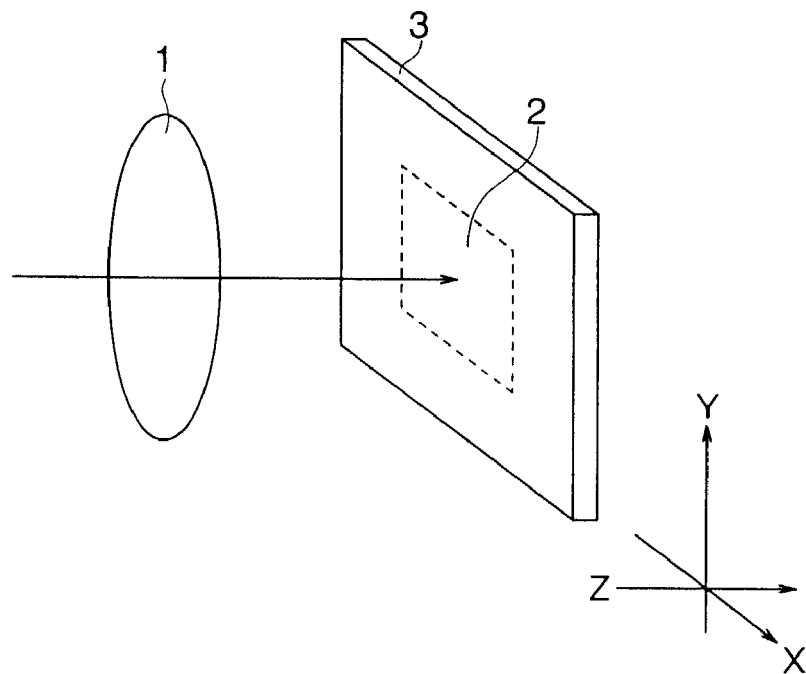
FIG. 1 shows an imaging device used in a conventional imaging apparatus.
Figure 2:
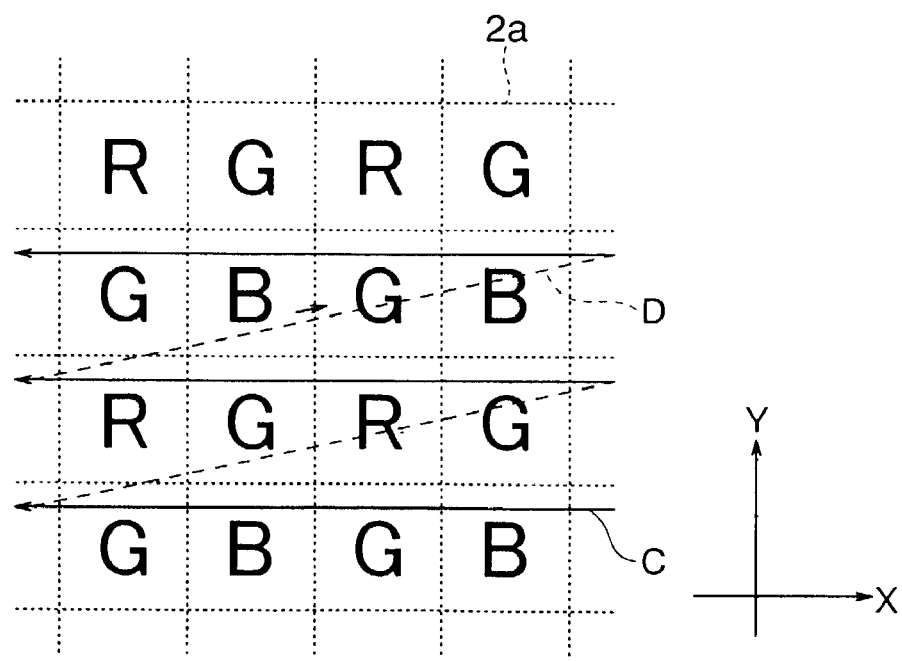
FIG. 2 illustrates the arrangement and scanning sequence of imaging elements in the conventional imaging apparatus.

Embodiments of the invention will be described with reference to the attached drawings, in which like parts are indicated by like reference characters.

Figure 19A:
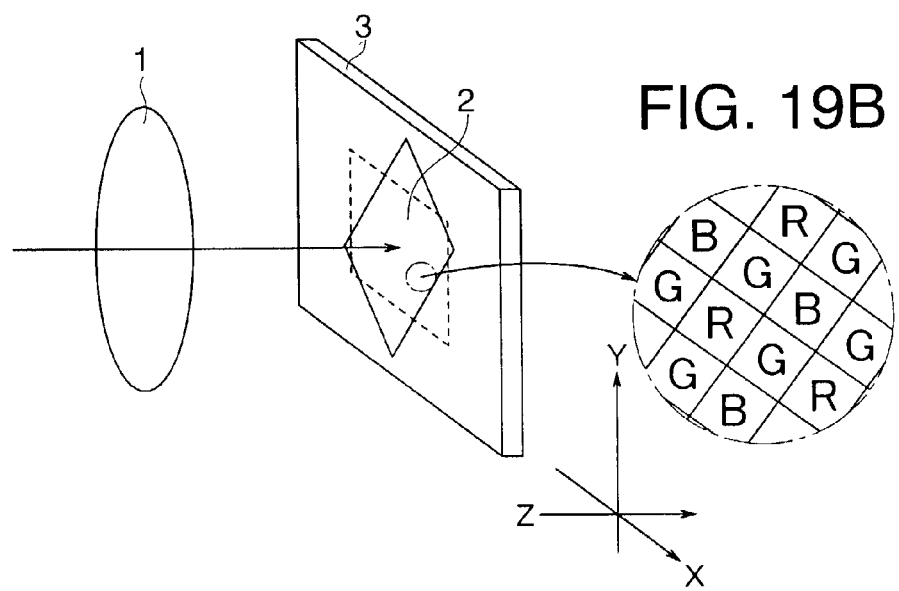
FIG. 19A schematically illustrates the orientation of the imaging device in a first embodiment of the invented imaging apparatus.

Referring to FIG. 19A, an imaging apparatus according to a first embodiment of the invention has a lens system 1, and an imaging device 2 mounted on a supporting substrate 3. The X, Y, and Z axes in the drawing indicate absolute directions, Y indicating the vertical direction under normal imaging conditions, and Z being the optic axis of the lens system 1. The imaging device 2 used in the present invention has a square row-column matrix array of pixels, and is mounted on the supporting substrate 3 so that the sides of the square are oriented at angles of forty-five degrees to the vertical axis Y. The rows and columns of pixels are thus aligned at angles of forty-five degrees with respect to the vertical axis Y, as shown in the enlarged view in FIG. 19B.

Figure 19B:
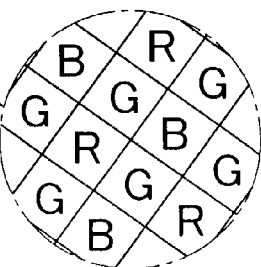
FIG. 19B shows an enlarged view of part of the red, green, and blue pixel matrix in FIG. 19A.

The letters R, G, and B in FIG. 19B denote pixels with red, green, and blue filters, respectively.

Figure 20:
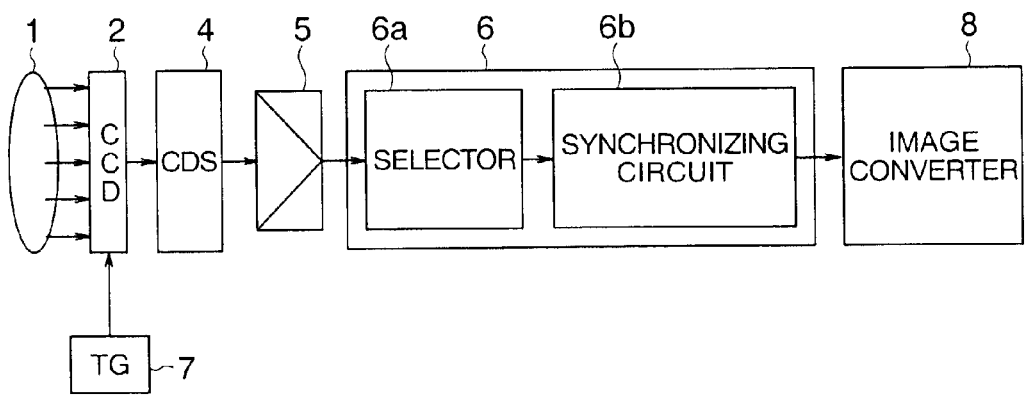
FIG. 20 is a block diagram of the imaging apparatus in the first embodiment.

Referring to FIG. 20, the first embodiment comprises, in addition to the lens system 1, the imaging device 2, and its supporting substrate 3 (not shown), a correlated double sampling (CDS) circuit 4 that removes noise from the output of the imaging device 2, leaving only signal components; an amplifier 5 that amplifies the output of the correlated double sampling circuit 4; a signal processing circuit 6 that carries out signal processing necessary to convert the amplified signal to a picture signal; a timing generator (TG) 7 that generates driving pulses necessary for driving the imaging device 2; and an image converter 8 that reorders the pixel signals received from the timing generator 7. The signal processing circuit 6 includes a selector 6a that selects the pixel signals that will become part of the image, and a synchronizing circuit 6b that interpolates the missing color signals for each pixel.

Figure 21:
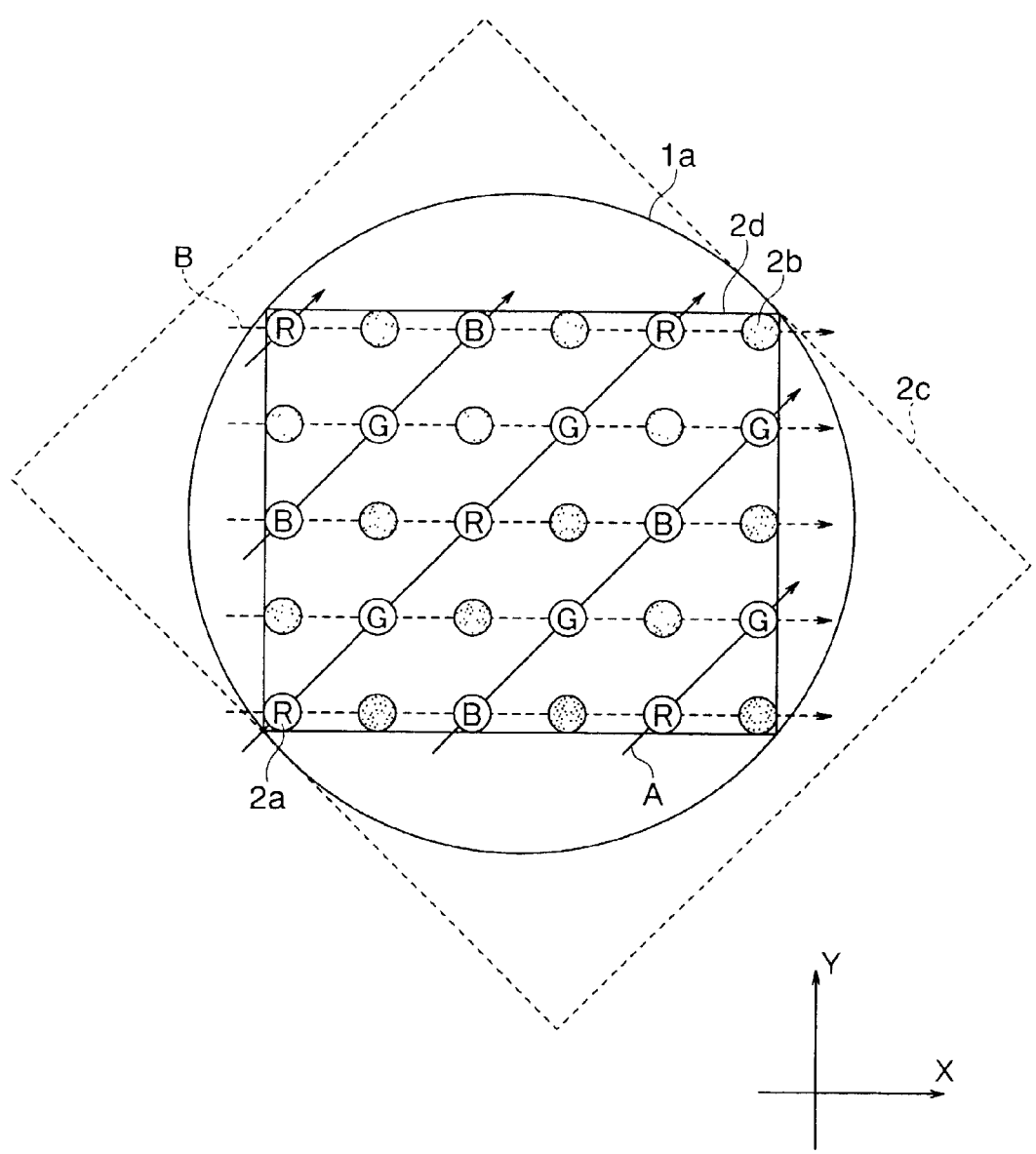
FIG. 21 shows the effective pixel area and effective picture area of the imaging device in FIG. 19A.

FIG. 21 shows an arrangement of pixels 2a plotted on the XY plane in FIG. 19A. Reference numeral 1a denotes the image circle of the lens system 1, 2a denotes a photoelectric transducer functioning as an imaging element or pixel, 2b denotes a missing pixel, 2c denotes the effective pixel area of the imaging device 2, and 2d denotes the effective picture area. The X and Y axes in FIG. 21 match those in FIG. 19A. The effective picture area 2d is located within both the image circle 1a and the effective pixel area 2c.

Figure 3:
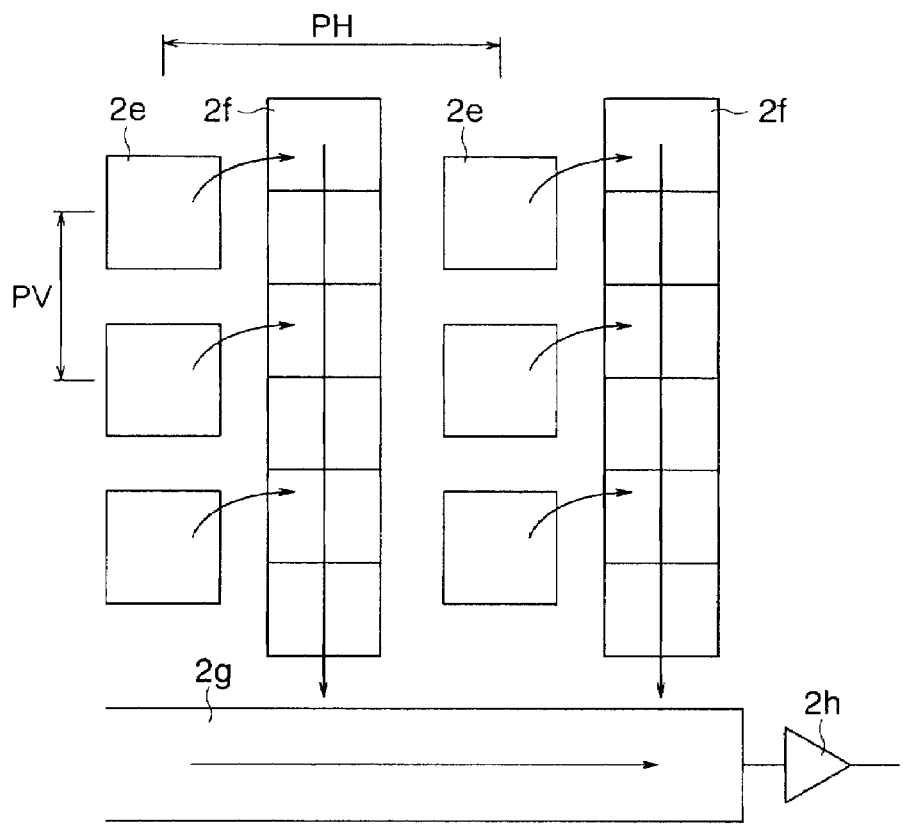
FIG. 3 schematically illustrates the structure of a CCD image sensor having a square matrix arrangement of imaging elements.
Figure 4:
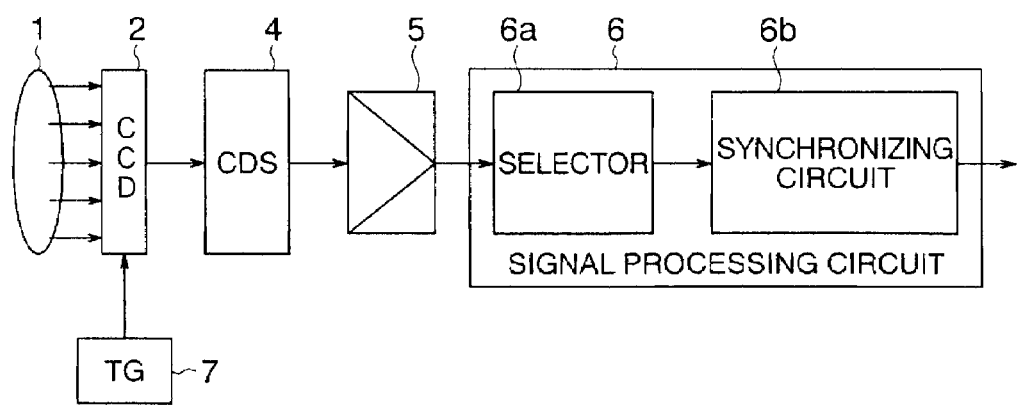
FIG. 4 is a block diagram of the conventional imaging apparatus.
Figure 5:
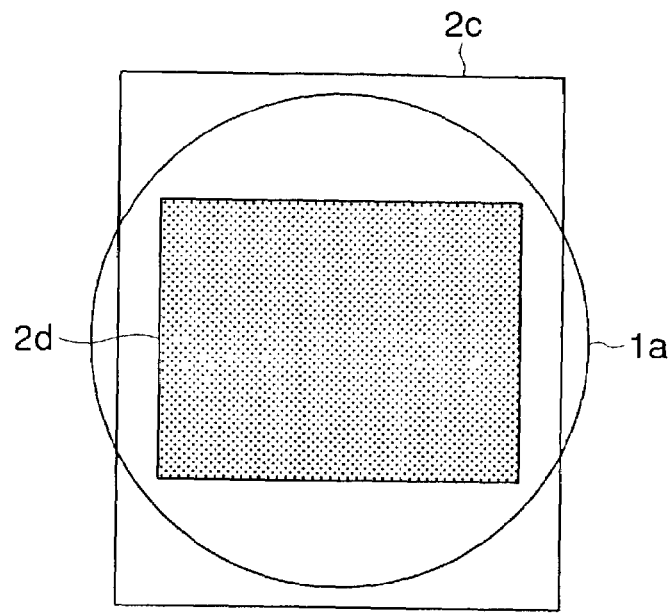
FIG. 5 illustrates the effective pixel area and effective picture area in the conventional imaging apparatus.

Arrow A in FIG. 21 indicates the order in which the pixel signals are read in the imaging device 2. Arrow B indicates the order in which the pixel signals are output from the image converter 8. The signals obtained from the photoelectric transducers 2a are read out through first transfer registers (interline transfer registers, not shown) disposed parallel to arrow A, and a second transfer register (not shown) disposed perpendicular to arrow A. Aside from being tilted at angles of forty-five degrees, these registers are similar to the conventional vertical transfer registers 2f and horizontal transfer register 2g shown in FIG. 3.

When driven by driving pulses from the timing generator 7, the imaging device 2 reads out pixel signals sequentially using the first and second transfer registers. First the signals from, for example, the column of pixels indicated by arrow A are read. When all pixel signals (including signals from pixels both inside and outside the effective picture area 2d) have been read from this column, the next column of pixels, parallel to arrow A, is read. Reading continues in similar fashion through the succeeding columns, the pixels in each column being read in order from lower left to upper right in the drawing, and the columns being read in order from lower right to upper left.

The pixel signals read from the imaging device 2 are processed by the correlated double sampling circuit 4, then amplified by the amplifier 5 in the same way as in a conventional imaging apparatus, and are input to the signal processing circuit 6.

The selector 6a in the signal processing circuit 6 selects the pixel signals included in the effective picture area 2d. The selection process differs from the conventional selection process, because the effective picture area 2d is now oriented at a forty-five-degree angle with respect to the effective pixel area 2c, as shown in FIG. 21.

Figure 22:
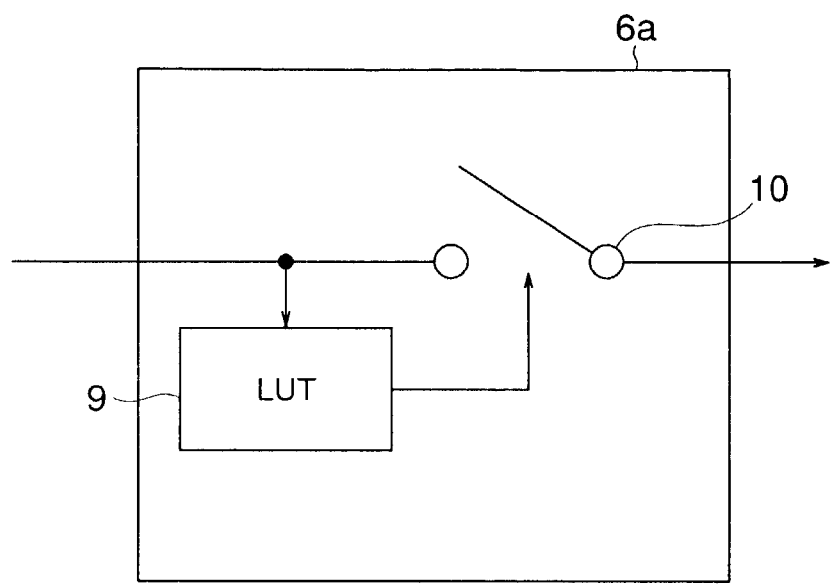
FIG. 22 shows an exemplary structure of the selector in the first embodiment, employing a lookup table and a switch.

The selector 6a can be structured as, for example, in FIG. 22, comprising a lookup table (LUT) 9 and a switch 10. The lookup table 9 includes, for example, a counter and a decoder comprising logic gates. The lookup table 9 incorporates preset address information indicating the boundaries of the effective picture area 2d. A signal output from the lookup table 9 switches the switch 10 on and off according to this address information, so that only signals from pixels included in the effective picture area 2d pass through the selector 6a.

Figure 23:
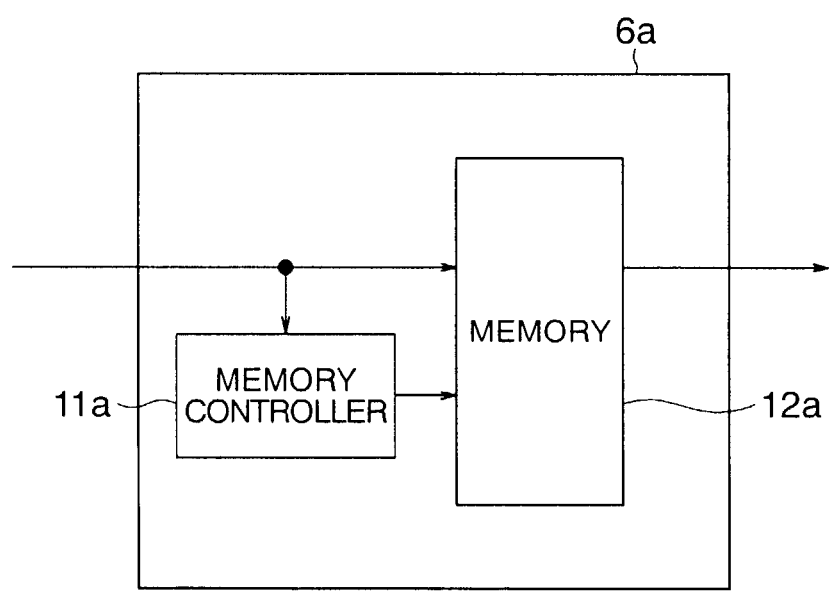
FIG. 23 shows an another exemplary structure of the selector in the first embodiment, employing a memory and a memory controller.

Alternatively, the selector 6a may comprise a memory controller 11a and a memory 12a as shown in FIG. 23. The memory controller 11a controls the memory 12a so that the memory 12a stores only signals from pixels included in the effective picture area 2d. These signals are read out from the memory 12a in, for example, the same sequence as the sequence in which they are stored.

The pixel signals selected by the selector 6a are supplied to the synchronizing circuit 6b. As shown in FIGS. 19B and 21, each pixel has a red, green, or blue color filter. One function of the synchronizing circuit 6b is to supply the missing color values at each pixel by interpolation from surrounding pixels, as in the conventional imaging apparatus. For example, the synchronizing circuit 6b supplies green and blue signal values for a pixel having a red filter.

In addition, the synchronizing circuit 6b supplies signal values for all three primary colors (red, green, and blue) at the missing pixel positions 2b in FIG. 21. A simple interpolation scheme uses the information from the real photoelectric transducers 2a disposed immediately above, below, and to the left and right of the missing pixel 2b. The synchronizing circuit 6b may also use information from more distant pixels to perform conventional linear interpolation, or perform correlated interpolation by making use of correlations between pixels. One correlated interpolation scheme is described in "Oblique pixel slide method using optical devices for digital cameras with a single CCD", Proceedings of SPIE, Vol. 4306, Sensors and Camera Systems for Scientific, Industrial, and Digital Photography Applications II (2001), pp. 403–413.

Figure 24:
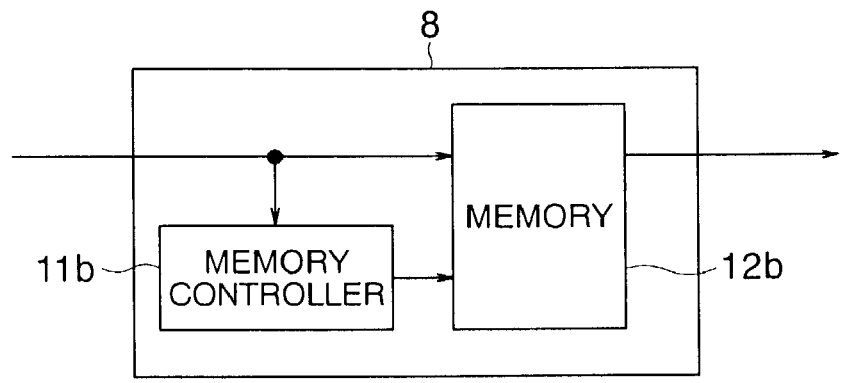
FIG. 24 shows an exemplary structure of the image converter in the first embodiment.

The red, green, and blue picture signals obtained from the signal processing circuit 6 still describe a picture rotated at an angle of forty-five degrees with respect to the vertical axis. The image converter 8 processes these signals to rotate the picture through forty-five degrees in the opposite direction. FIG. 24 shows an exemplary structure of the image converter 8, comprising a memory controller 11b and a memory 12b. The memory 12b stores the picture signals input from the signal processing circuit 6 at write addresses designated by the memory controller 11b, and outputs the stored signals from read addresses also designated by the memory controller 11b. The memory controller 11b controls the read and write addresses so that, although the signals received from the signal processing circuit 6 are stored in the order indicated by the solid arrows (A) in FIG. 21, they are read out in the order indicated by the dotted arrows (B) in FIG. 21. The picture signals output from the image converter 8 are therefore raster-scan signals with horizontal scanning lines, highly compatible with standard display devices, including the display devices used in mobile telephones and portable terminal equipment such as PDAs.

Figure 25:
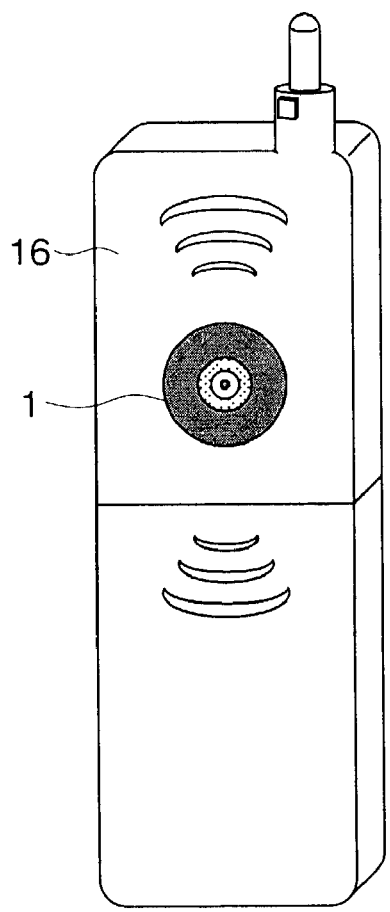
FIG. 25 is a rear view of a mobile telephone incorporating the imaging apparatus of the first embodiment.
Figure 26:
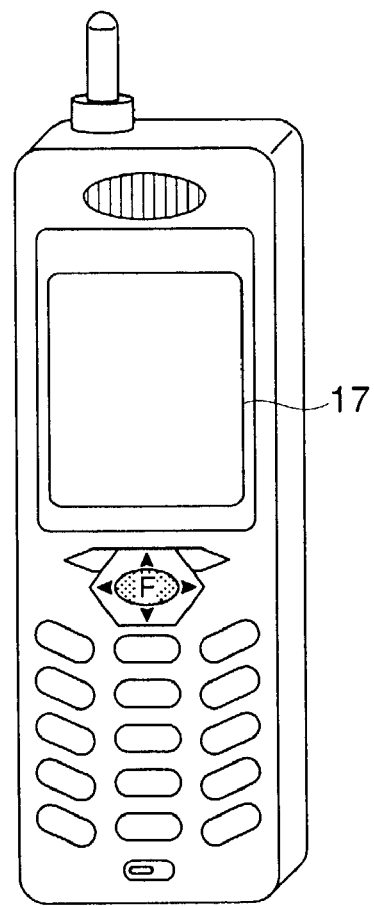
FIG. 26 is a front view of the mobile telephone of FIG. 25.

FIGS. 25 and 26 show a mobile telephone provided with the imaging apparatus of the first embodiment of the invention. FIG. 25 is a rear view of the mobile telephone 16, showing the lens system 1 of the imaging apparatus. FIG. 26 is a front view of the mobile telephone, showing a display device 17 such as a liquid crystal display on which the image produced by the imaging apparatus is displayed.

The mobile telephone 16 includes a computing device such as a microprocessor or microcontroller (not shown) that performs signal-processing functions and other mobile terminal functions, such as storing and retrieving telephone numbers. This computing device preferably also controls the memory 12b in the image converter 8, thereby performing the function of the memory controller 11b, and may also perform some of the functions of the signal processing circuit 6, such as controlling the memory 12a in FIG. 23. The memory of the mobile telephone 16 may be used as the memories 12a, 12b in FIGS. 23 and 24.

Figure 6:
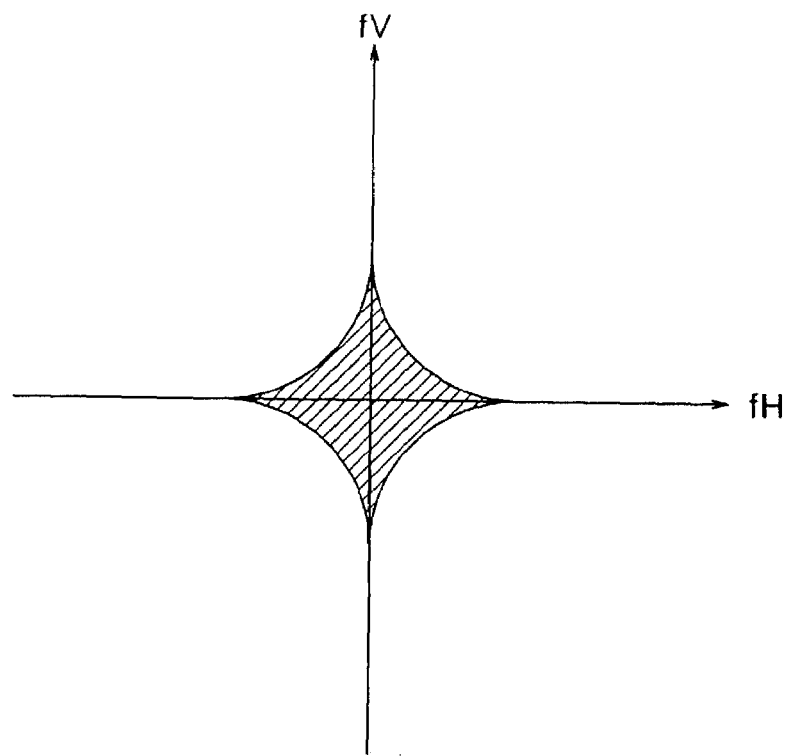
FIG. 6 illustrates typical frequency characteristics of natural subjects.
Figure 7:
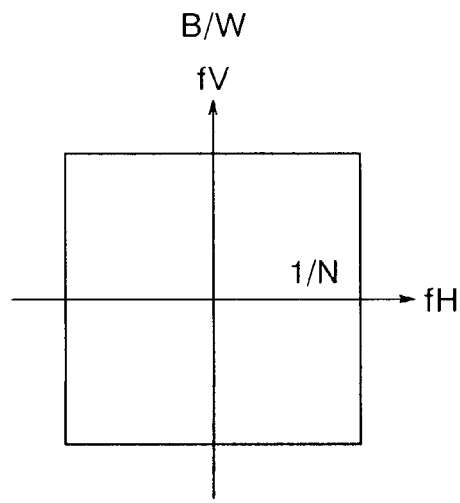
FIG. 7 shows the spatial frequency range of a black-and-white picture imaged by imaging elements arranged in a square matrix.
Figure 8:
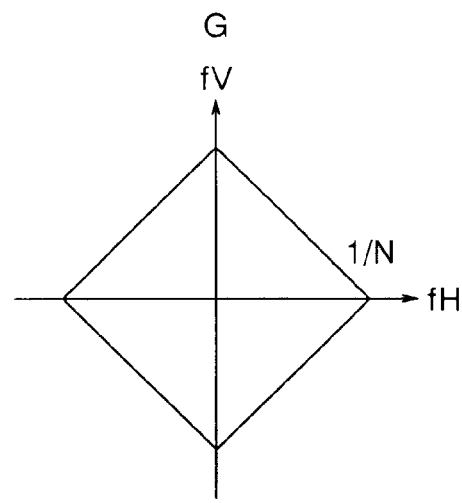
FIG. 8 shows the spatial frequency range of the green signal in a square matrix.
Figure 9:
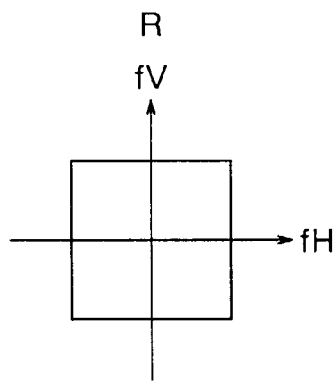
FIG. 9 shows the spatial frequency range of the red signal in a square matrix.
Figure 10:
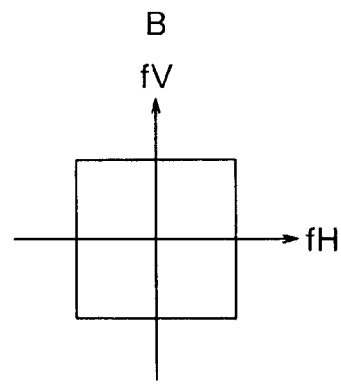
FIG. 10 shows the spatial frequency range of the blue signal in a square matrix.
Figure 11:
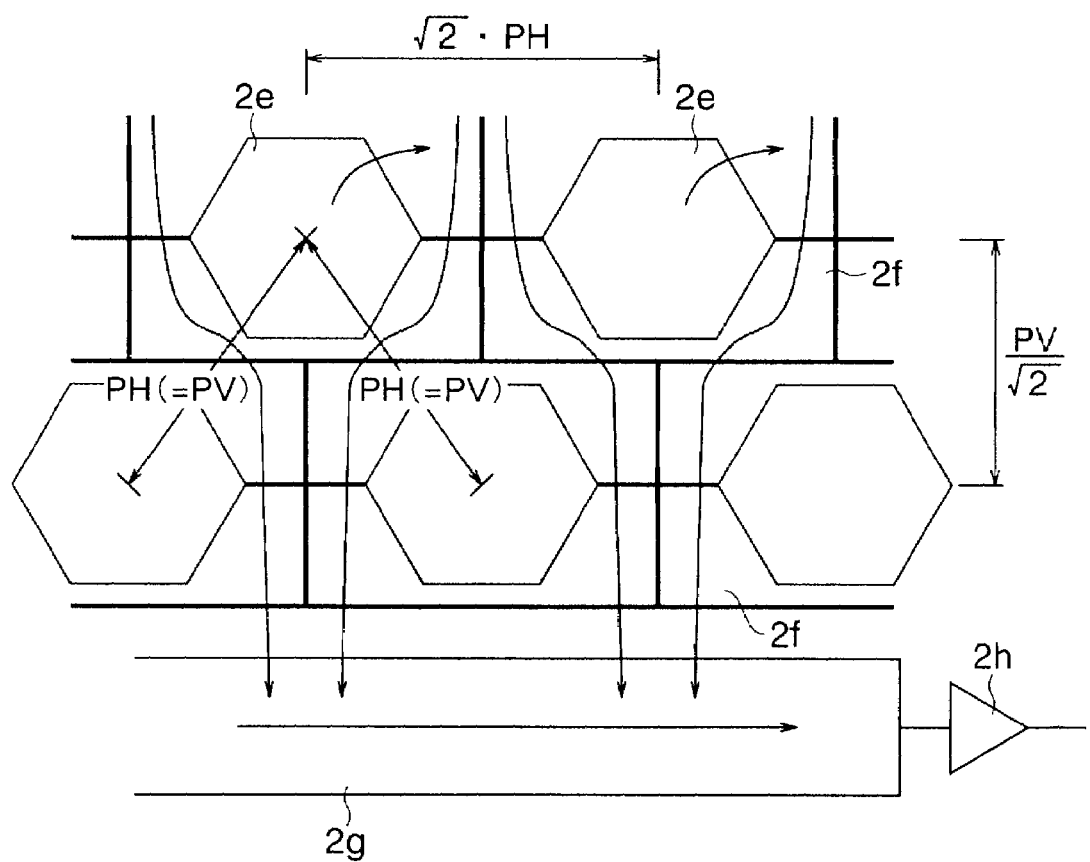
FIG. 11 shows an offset arrangement of imaging elements.
Figure 12:
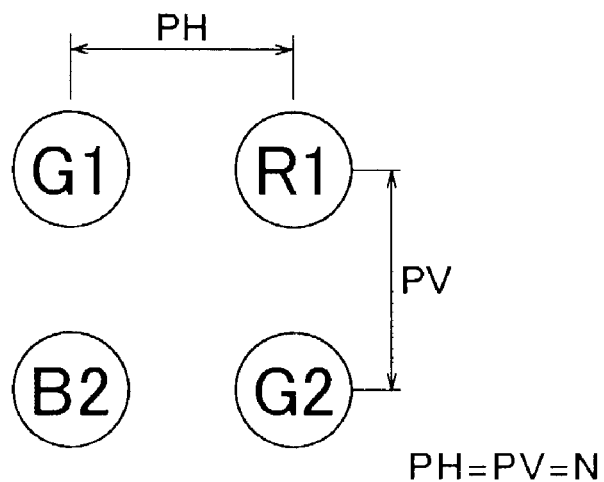
FIG. 12 shows the spacing between pixels arranged in a square matrix.
Figure 13:
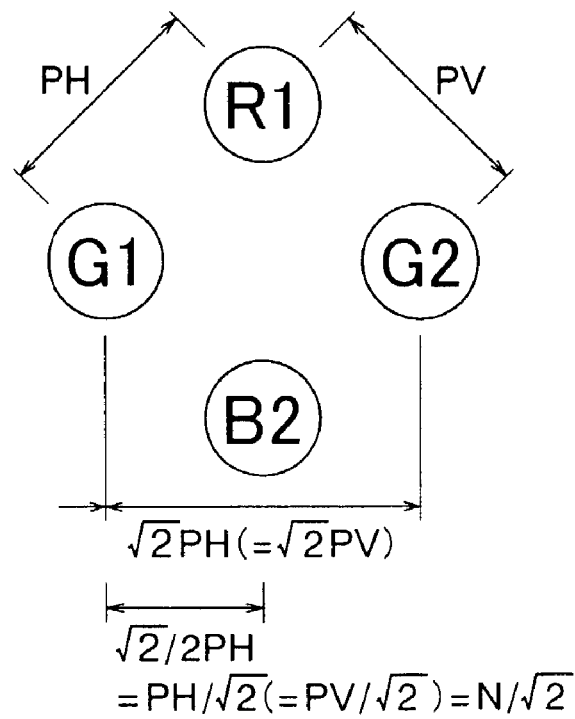
FIG. 13 shows the spacing between pixels in the offset arrangement.
Figure 14:
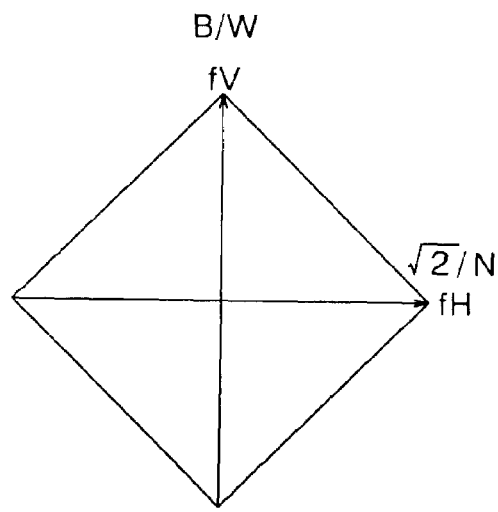
FIG. 14 shows the spatial frequency range of a black-and-white picture imaged by imaging elements having the offset arrangement.
Figure 15:
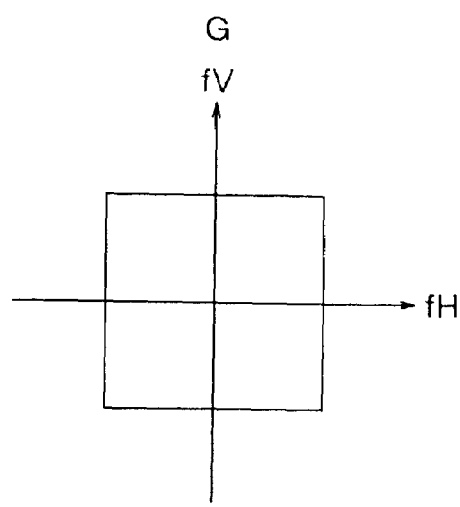
FIG. 15 shows the spatial frequency range of the green signal in the offset arrangement.
Figure 16:
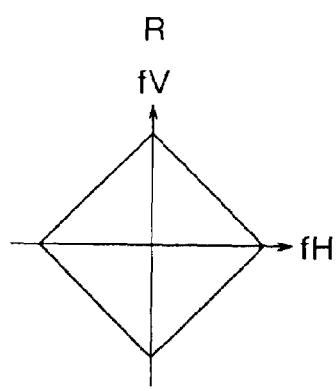
FIG. 16 shows the spatial frequency range of the red signal in the offset arrangement.
Figure 17:
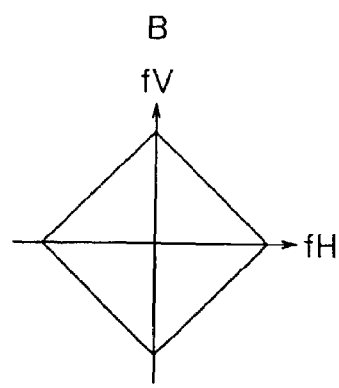
FIG. 17 shows the spatial frequency range of the blue signal in the offset arrangement.
Figure 18:
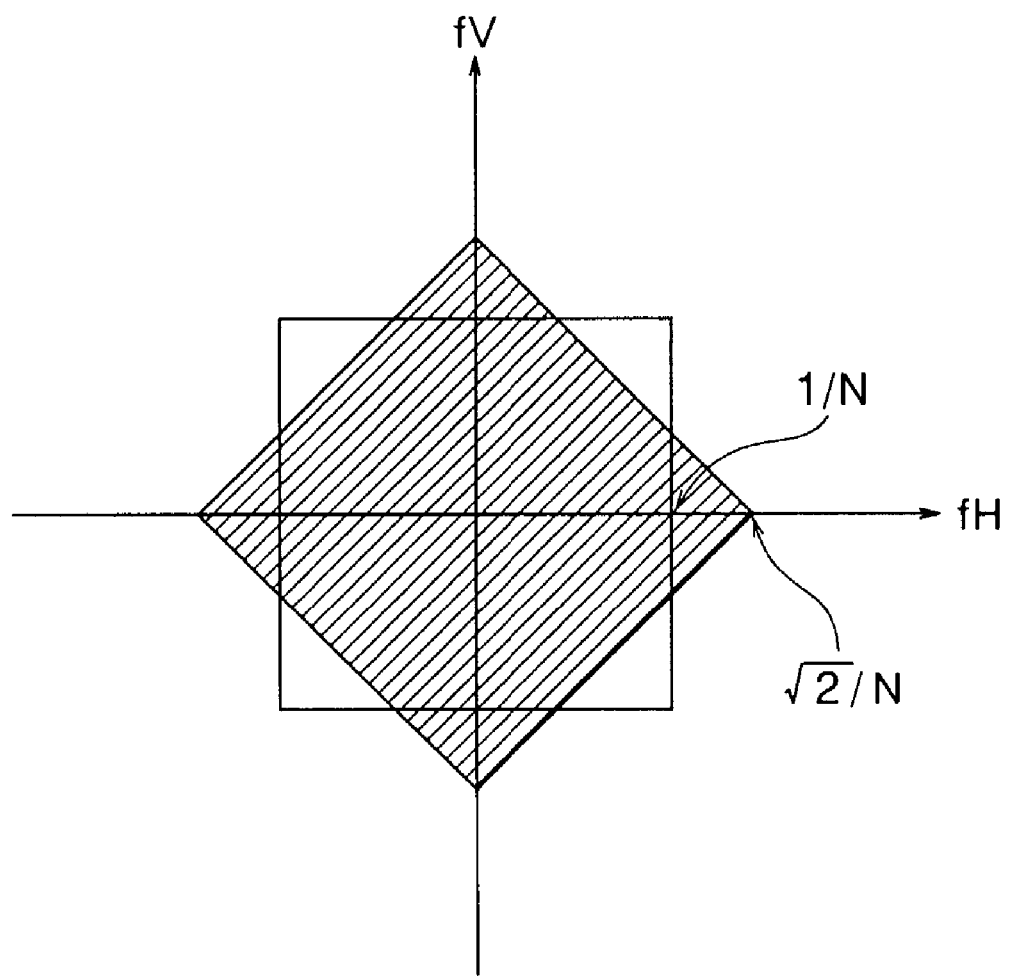
FIG. 18 compares the frequency characteristics of the square matrix and offset arrangement.

As described above, the first embodiment uses an imaging device 2 of the conventional square matrix type, with straight interline transfer registers, but tilts the matrix at an angle of forty-five degrees with respect to the vertical axis, so that the imaging elements 2a have an offset arrangement similar to that shown in FIG. 13. The frequency characteristics of the imaging device 2 therefore match those of typical natural subjects, shown in FIG. 6. Interpolation of signal values for the missing pixels 2b produces an image with improved horizontal and vertical resolution, as compared with the conventional imaging apparatus in FIG. 1, because the subject's spatial frequencies are sampled more effectively. Use of the image converter 8 enables the improved resolution to be obtained without the need for zigzag transfer registers of the type shown in FIG. 11. The first embodiment of the invention can be practiced with a standard CCD image sensor.

In a variation of the first embodiment, the signals stored in the memory 12a of the selector 6a (FIG. 23) and/or the memory 12b of the image converter 8 are compressed. Any known image compression method may be employed, such as the method standardized by the Joint Photographic Experts Group (JPEG). In a mobile telephone, the image data compression and decompression processes may be carried out by the mobile telephone's internal computing device.

In another variation of the first embodiment, the image converter 8 rotates the image in the opposite direction, so that the final output signals describe a picture with vertical raster scanning lines.

Figure 27:
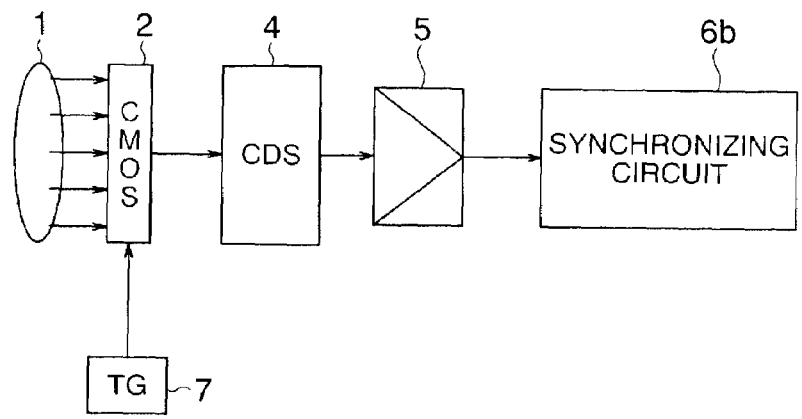
FIG. 27 is a block diagram of the imaging apparatus in the second embodiment of the invention.

FIG. 27 shows the structure of an imaging apparatus according to the second embodiment of the invention. The lens system 1, correlated double sampling circuit 4, amplifier 5, and synchronizing circuit 6b are similar to the corresponding elements in the first embodiment. The imaging device 2 is now a complementary metal-oxide-semiconductor (CMOS) image sensor with features that obviate the need for the selector and image converter of the first embodiment.

Figure 28:
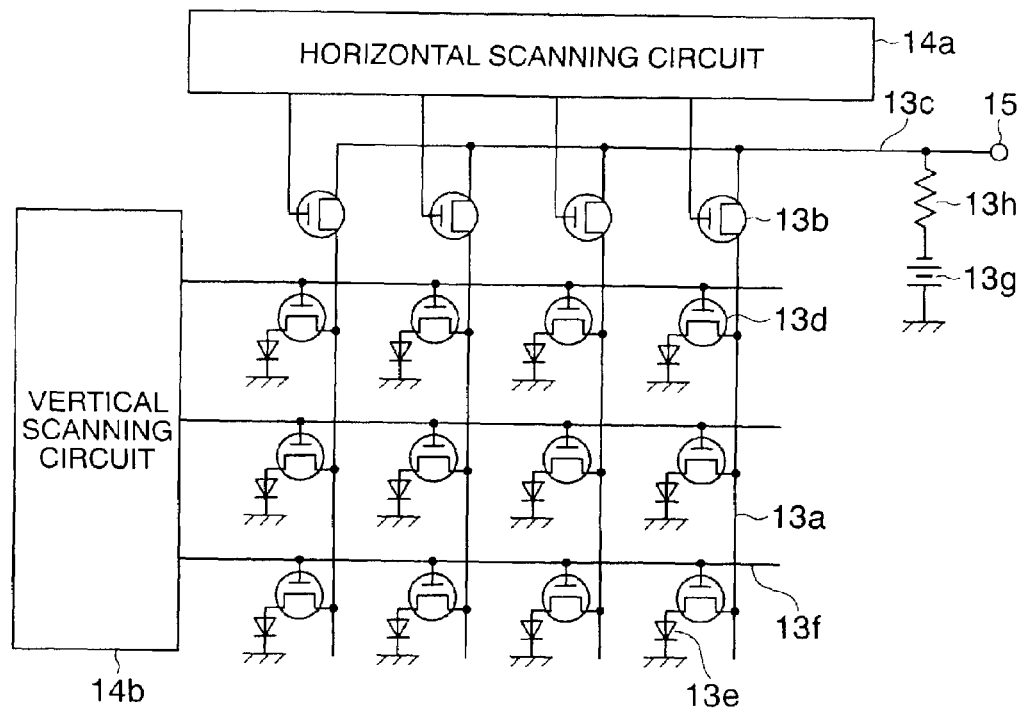
FIG. 28 schematically shows the structure of a CMOS sensor used as an imaging device in the second embodiment.

FIG. 28 shows the basic structure of a CMOS image sensor. The sensor includes a plurality of first signal lines 13a that are coupled through respective CMOS switches 13b to a second signal line 13c. The first signal lines 13a are also coupled through further CMOS switches 13d to a plurality of photodiodes 13e, which are arranged in a square matrix. Each photodiode 13e functions as an imaging element or pixel.

The CMOS switches 13b are controlled by a horizontal scanning circuit 14a. The further CMOS switches 13d are controlled by a vertical scanning circuit 14b via scanning signal lines 13f oriented in the row direction of the pixel matrix, parallel to the second signal line 13c, and at right angles to the first signal lines 13a, which extend in the column direction of the pixel matrix. For simplicity the CMOS switches 13b, 13d are shown as single transistors, but each switch actually comprises a complementary pair of transistors.

The signal lines 13a, 13c, CMOS switches 13b, 13d, photodiodes 13e, and scanning circuits 14a, 14b may all be incorporated into a single monolithic semiconductor integrated circuit.

When the horizontal scanning circuit 14a turns on one CMOS switch 13b and the vertical scanning circuit 14b drives one of the scanning lines 13f, turning on the further CMOS switches 13d connected thereto, current flows from a power source 13g through a resistor 13h, the turned-on CMOS switch 13b, one of the turned-on CMOS switches 13d, and the connected one of the photodiodes 13e to ground. The rate of current flow is responsive to the illumination of the photodiode 13e. The resistor 13h converts the current signal to a voltage signal for output at an output terminal 15. The signals from the photodiodes 13e can be read in random-access fashion, by driving an arbitrary CMOS switch 13b and an arbitrary scanning line 13f.

In FIG. 28, the first signal lines 13a extend vertically and the second signal line 13c extends horizontally, but when the imaging device 2 is mounted in the imaging apparatus, it is tilted at an angle of forty-five degrees, as in FIGS. 19A, 19B, and 21 in the first embodiment. The scanning circuits 14a, 14b are provided with address information causing them to drive the CMOS switches 13b and scanning line 13f in a predetermined sequence such that the signals from the photodiodes 13e in the effective picture area are read out in a sequence corresponding to the dotted arrows (B) in FIG. 21.

Alternatively, the scanning circuits 14a, 14b may operate according to externally supplied address signals. These address signals can be supplied by a controller generally similar to the memory controllers 11a, 11b in FIGS. 23 and 24. If the second embodiment is incorporated into terminal equipment such as a mobile telephone having an internal computing device, the address signals can be generated by this computing device.

After correlated double sampling and amplification of the output of the imaging device 2, the synchronizing circuit 6b supplies missing signal values, such as signal values at the missing pixel positions 2b in FIG. 21, to complete the generation of a picture signal having horizontal raster scanning lines, compatible with a standard display device.

For color imaging, the photodiodes 13e in the second embodiment may have red, green, and blue filters as in the first embodiment.

The second embodiment provides the same effects as the first embodiment, without the need for a selector 6a and image converter 8.

A few variations of the preceding embodiments have been mentioned above, but those skilled in the art will recognize that further variations are possible within the scope of the invention as defined in the appended claims.

What is claimed is:

1. An imaging apparatus having a vertical axis and having an optical system for forming an image of a subject, the imaging apparatus comprising:
    an imaging device having a plurality of pixels aligned in rows and columns in a square two-dimensional matrix on which the image of the subject is formed, a first transfer unit for reading pixel signals from the pixels in a predetermined order and transferring the pixel signals in a direction parallel to the columns, and a second transfer unit for receiving the pixel signals from the first transfer unit and transferring the pixel signals in a direction parallel to the rows, for output from the imaging device; and
    a supporting substrate on which the imaging device is mounted so that the rows and the columns of the pixels are disposed at angles of substantially forty-five degrees with respect to the vertical axis of the imaging apparatus.

2. The imaging apparatus of claim 1, wherein the first transfer unit comprises registers disposed between the columns of said pixels and the second transfer unit comprises a register disposed parallel to the rows of said pixels.

3. The imaging apparatus of claim 2, wherein the imaging device is a charge-coupled device.

4. The imaging apparatus of claim 2, wherein the pixel signals are output from the imaging device in order of said rows and columns, further comprising:
    a memory for temporarily storing the pixel signals output from the imaging device; and
    a memory controller for reading the pixel signals from the memory in an order conforming to a scanning sequence with scanning lines parallel to or perpendicular to said vertical axis.

5. A portable terminal including the imaging apparatus of claim 4, wherein said memory controller also operates as a computing device performing terminal functions of the portable terminal.

6. The portable terminal of claim 5, wherein the portable terminal is a telephone set.

7. The imaging apparatus of claim 4, further comprising an interpolating unit for interpolating pixel values at positions of missing pixels in said scanning lines parallel to or perpendicular to said vertical axis.

8. The imaging apparatus of claim 1, wherein:
    the first transfer unit includes a plurality of first signal lines oriented parallel to the columns of said pixels and a plurality of first switches coupling the pixels to the first signals lines;
    the second transfer unit includes a second signal line oriented parallel to the rows of said pixels and a plurality of second switches coupling said first signal lines to the second signal line; and
    the imaging device also includes a first scanning circuit for controlling the first switches and a second scanning circuit for controlling the second switches.

9. The imaging apparatus of claim 8, wherein the imaging device is a complementary metal-oxide semiconductor image sensor.

10. The imaging apparatus of claim 8, wherein the first scanning circuit and the second scanning circuit control the first switches and the second switches so that the pixel signals are output from the imaging device in a scanning sequence with scanning lines parallel to or perpendicular to said vertical axis.

11. The imaging apparatus of claim 10, further comprising an interpolating unit for interpolating pixel values at positions of missing pixels in said scanning lines parallel to or perpendicular to said vertical axis.

* * * * *